US009514763B2

(12) United States Patent
Kapinos

(10) Patent No.: US 9,514,763 B2
(45) Date of Patent: Dec. 6, 2016

(54) NOISE REDUCTION VIA TUNED ACOUSTIC ECHO CANCELLATION

(71) Applicant: Lenovo (Singapore) Pte. Ltd., Singapore (SG)

(72) Inventor: Robert James Kapinos, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 496 days.

(21) Appl. No.: 13/894,507

(22) Filed: May 15, 2013

(65) Prior Publication Data

US 2014/0341383 A1 Nov. 20, 2014

(51) Int. Cl.
*H04B 3/20* (2006.01)
*G10L 21/02* (2013.01)
*G10L 21/0208* (2013.01)

(52) U.S. Cl.
CPC ...... *G10L 21/02* (2013.01); *G10L 2021/02082* (2013.01)

(58) Field of Classification Search
CPC ...... H04M 9/082; H04M 9/08; H04M 3/002; H04M 3/568; H04M 1/72591; H04R 3/02; H04R 3/002; H04R 3/005; H04R 2499/11; H04R 2499/13; H04R 2499/15; H04R 2430/03; H04R 1/1083; H04R 1/1091; H04R 1/406; H04B 3/23; H04B 3/20; H04B 3/234; H04B 3/235; G10L 2021/02082; G10L 2021/02166; G10L 2021/02165; G10L 19/012; G10L 19/00; G10L 15/20; G10K 11/16; G10K 11/175; G10K 11/178; G10K 2210/505; G10K 2210/1081; G10K 11/002; G10K 11/346; H03G 3/20; H03G 5/165; H03G 9/025; H03F 2200/03
USPC ......... 381/17, 18, 19, 20, 21, 300, 301, 302, 381/303, 307, 119, 66, 27, 71.1, 71.6, 71.9, 381/71.11, 71.12, 26, 318, 86, 92, 94.1, 93, 381/95, 96, 122, 123; 379/406.01–406.16; 455/569.1, 570
See application file for complete search history.

(56) References Cited

U.S. PATENT DOCUMENTS

| | | | | |
|---|---|---|---|---|
| 4,903,247 | A * | 2/1990 | Van Gerwen | H04B 3/237 367/135 |
| 5,329,586 | A * | 7/1994 | Agazzi | H04B 3/231 379/406.06 |
| 6,760,451 | B1 * | 7/2004 | Craven | H03G 5/005 381/59 |
| 2004/0240675 | A1 | 12/2004 | Casparian et al. | |
| 2004/0243405 | A1 | 12/2004 | Casparian et al. | |
| 2009/0154717 | A1 * | 6/2009 | Hoshuyama | H04R 3/02 381/66 |
| 2010/0208908 | A1 * | 8/2010 | Hoshuyama | H04M 9/082 381/66 |

OTHER PUBLICATIONS

Dai, et al., "Compensation of Loudspeaker Nonlinearity in Acoustic Echo Cancellation Using Raised-Cosine Function", IEEE Transactions on Circuits and Systems—II: Express Briefs, vol. 53, No. 11, Nov. 2006, p. 1190-1194.*

* cited by examiner

*Primary Examiner* — Leshui Zhang
(74) *Attorney, Agent, or Firm* — Ference & Associates LLC

(57) ABSTRACT

An embodiment provides a method, including: accessing a tuned corrective mask stored in a memory device; forming, using a processor, a tuned acoustic echo cancellation mask utilizing the tuned-corrective mask; applying, using a processor, the tuned acoustic echo cancellation mask to a digital audio signal; and outputting an echo-cancelled audio signal. Other aspects are described and claimed.

20 Claims, 6 Drawing Sheets

NOISE REDUCTION VIA TUNED ACOUSTIC ECHO CANCELLATION

BACKGROUND

Information handling devices such as personal computers (PCs), tablets and smart phones (hereinafter "devices") use acoustic echo cancellation (also referred to herein as "AEC") to handle simultaneous recording and playback situations. AEC is done by subtracting the signal output through the speakers from the recorded input signal. A time bias is conventionally applied to handle the lag between playback and recording.

BRIEF SUMMARY

In summary, one aspect provides a method, comprising: accessing a tuned corrective mask stored in a memory device; forming, using a processor, a tuned acoustic echo cancellation mask utilizing the tuned-corrective mask; applying, using a processor, the tuned acoustic echo cancellation mask to a digital audio signal; and outputting an echo-cancelled audio signal.

Another aspect provides an information handling device, comprising: one or more processors; and a memory device storing instructions executable by the one or more processors, the instructions comprising program code configured to: access a tuned corrective mask stored in a memory device; form, using a processor, a tuned acoustic echo cancellation mask utilizing the tuned-corrective mask; apply, using a processor, the tuned acoustic echo cancellation mask to a digital audio signal; and output an echo-cancelled audio signal.

A further aspect provides a program product, comprising: a storage medium having computer program code embodied therewith, the computer program code comprising: computer program code configured to access a tuned corrective mask stored in a memory device; computer program code configured to form, using a processor, a tuned acoustic echo cancellation mask utilizing the tuned-corrective mask; computer program code configured to apply, using a processor, the tuned acoustic echo cancellation mask to a digital audio signal; and computer program code configured to output an echo-cancelled audio signal.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
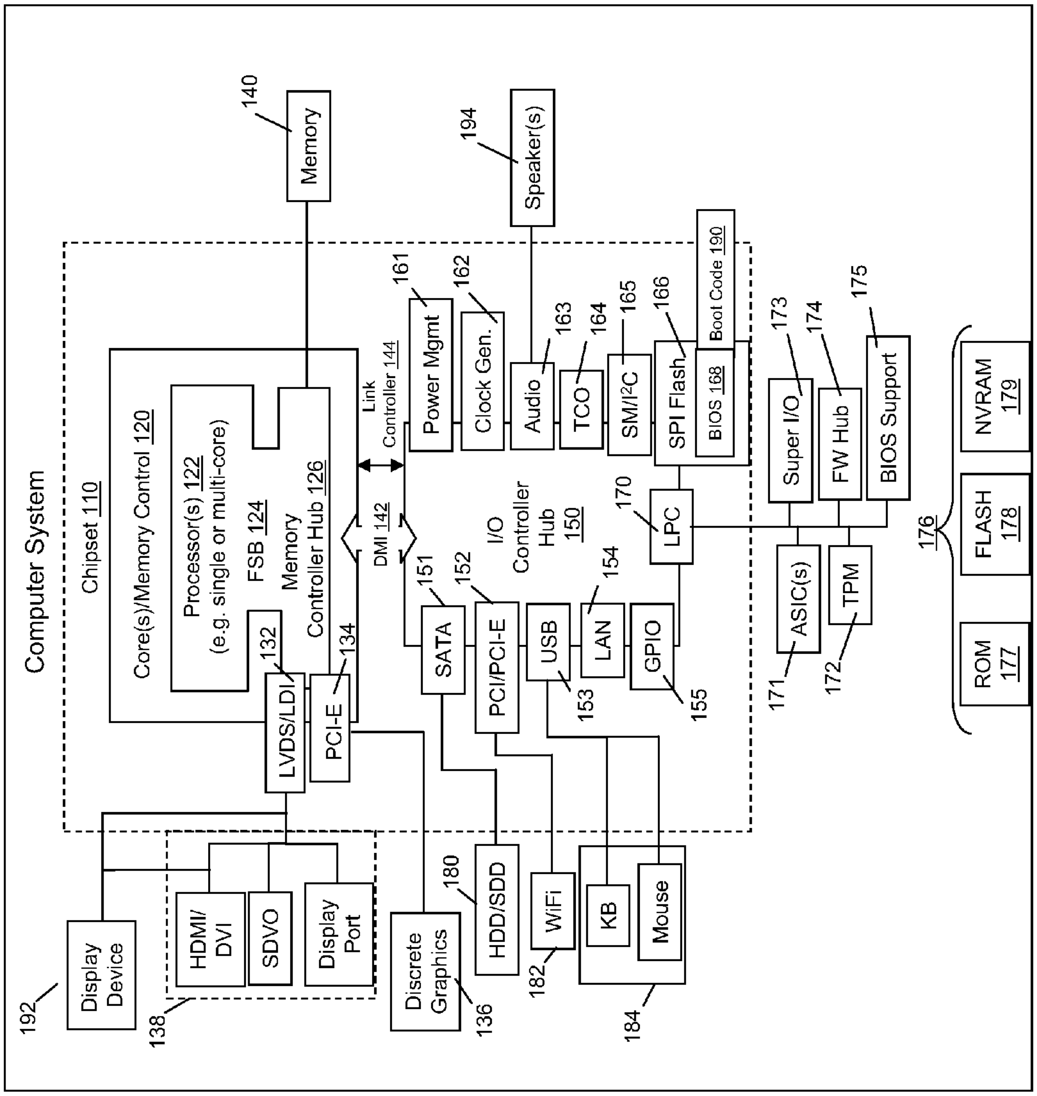
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Simultaneous playback and recording scenarios are defined as a user recording sound with a device and the device outputting sound during the recording process. For example, a user talking into a speakerphone while listening to it is both playing the other caller's voice while recording his own. Acoustic error cancellation is necessary to eliminate the feedback loops that occur by the sound being multiply recorded over itself to the limit of the speaker outputs. The quality of the echo cancellation depends on the physical and electrical characteristics of the sound output mechanism and the recording apparatus, as well as some external factors. Gaining good quality echo cancellation has conventionally been addressed by dual microphone porting, time and amplitude biased AEC, speaker correction, and recording side noise reduction algorithms. Each of these approaches has drawbacks.

Dual microphone porting includes adding a second microphone pointed off-axis of the recording microphone to allow for the creation of a true differential speaker signal to use in AEC. Using such a mask provides effective cancellation of speaker sounds, but adds distortion from ambient sounds and low volume copies of sounds that are intended to be recorded. Having two microphones also is more expensive, and the requirement of the primary microphone to be uni-directional prevents the use of better MicroElectrical-Mechanical System microphones.

Time and amplitude bias AEC is done by subtracting a time biased, amplitude corrected version of the signal input to the speakers from the recorded speakers. The time delay and amplitude bias are created using simple measurement of incoming audio signals to similarities with the digital output signal that needs cancelling. It introduces distortion by not having a true representation of the speaker output. Thus, the speaker output cannot be effectively cancelled in the resultant recording.

Speaker correction includes frequency based post processing which may be applied prior to the speaker to make its output more linear. A frequency mask based on measured speaker output characteristics is applied to the speaker input signal. A post-processing of speaker output is similar to a standard AEC mask. Post processing can make the echo cancellation more accurate, but cannot overcome intrinsic speaker limitations. Also, post processing can introduce artifacts due to overcompensation in the frequency ranges of weak signals.

Various noise reduction algorithms are used to remove low level noise, single frequency noises, and aliased frequencies. These algorithms can reduce echo by eliminating low volume or constant inputs. Since these algorithms are not related to the echo that requires removal, they distort the signal.

Accordingly, an embodiment uses (empirical) measures of the actual speaker output characteristics to make a tuned corrective frequency mask. When an AEC mask is then created based on speaker input (dynamically), an embodiment applies a correction from the tuned corrective frequency mask to form a speaker tuned AEC mask. This procedure generally consists of converting the time based AEC data to the frequency domain, adding the inverse of the tuned frequency mask in a number of frequency windows, followed by converting the result back to the time domain. The result is a speaker tuned AEC mask. When the recorded signal is processed, an embodiment may then apply the speaker tuned AEC mask to it to remove noise.

The illustrated example embodiments will be best understood by reference to the figures. The following description is intended only by way of example, and simply illustrates certain example embodiments.

Figure 2:
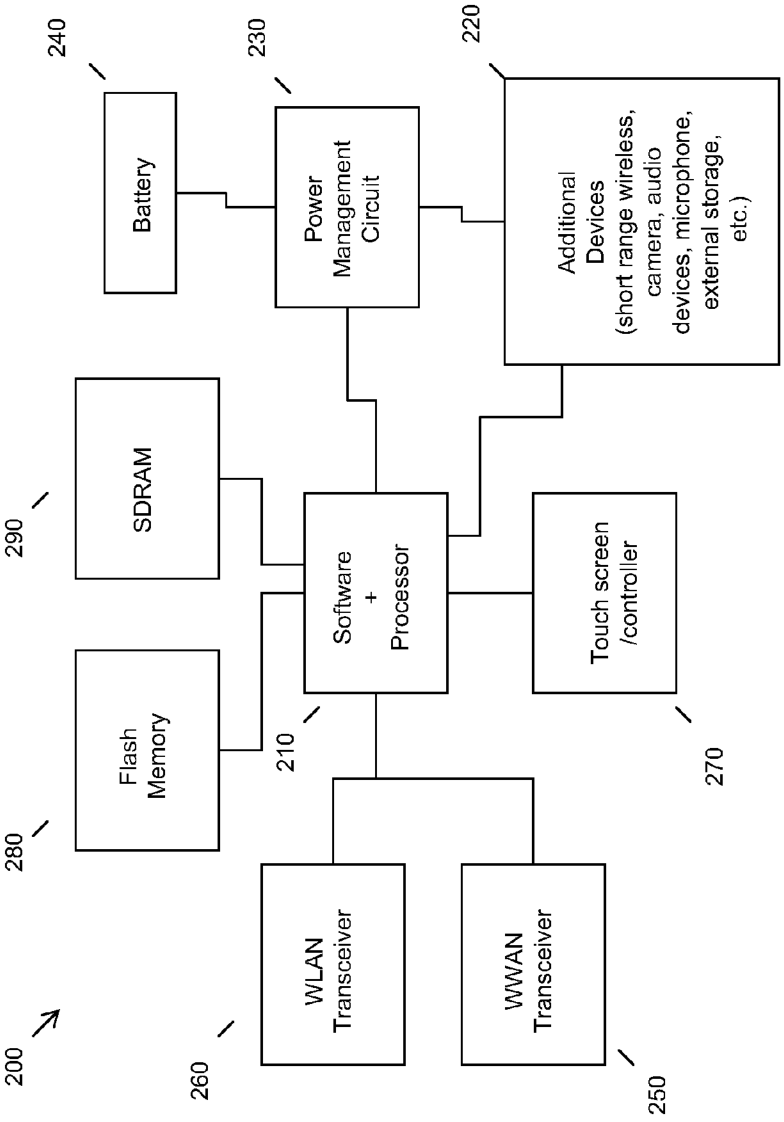
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, which may be used in connection with managing battery cells, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide the ability for simultaneous play back (e.g., via speaker(s)) and recording (e.g., via microphone(s)). A simultaneous play back and recording scenario includes for example a speaker phone application where audio (e.g., of user 1 on a call) is played by device speakers and audio (e.g., of user 2) is recorded by a microphone of the device.

In such scenarios, conventionally AEC is performed by a digital signal processor (DSP) on a sound chip/audio sub system, which has memory on chip for storing various AEC algorithms. Embodiments apply a modified AEC using a tuned corrective frequency mask.

Figure 3:
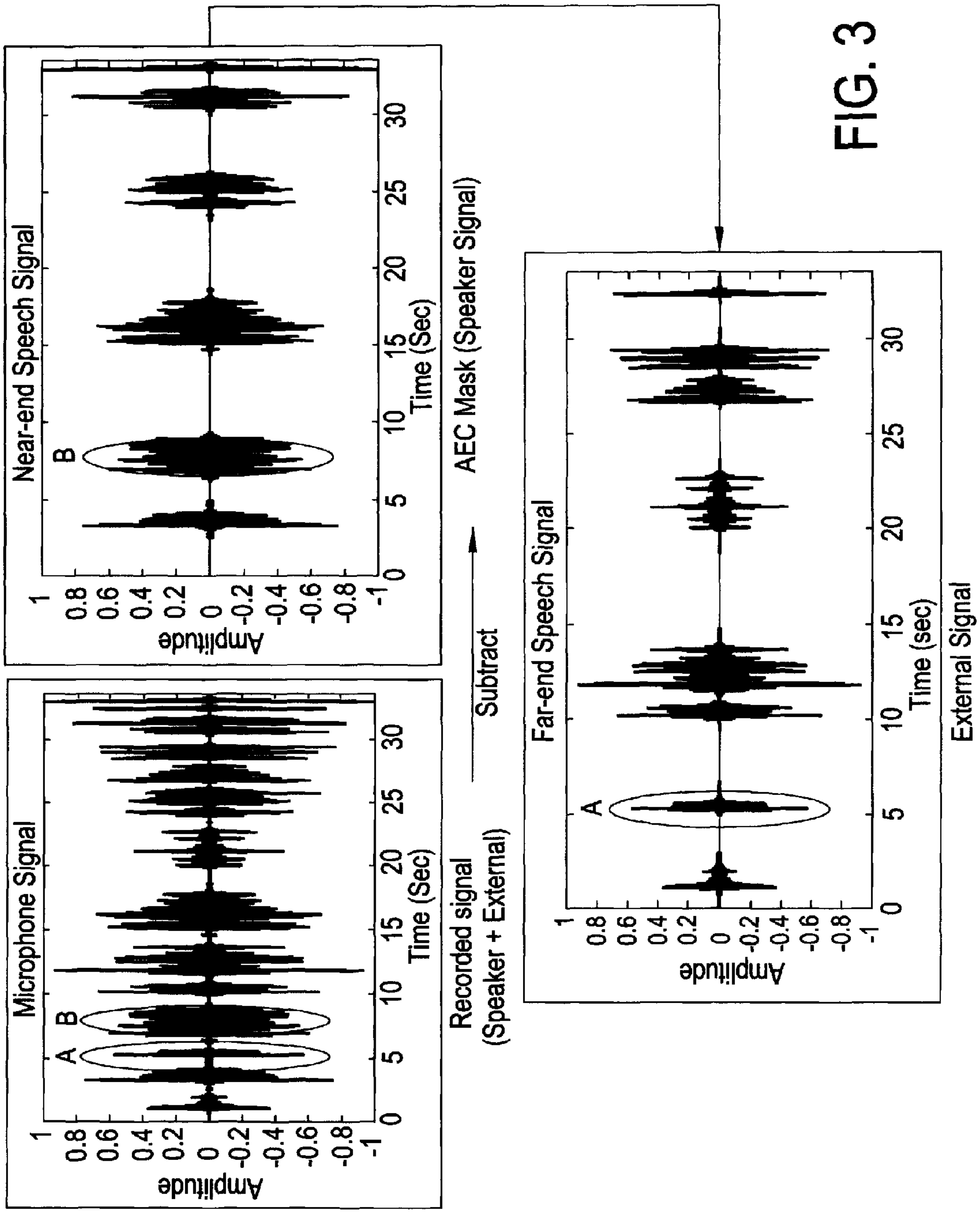
FIG. 3 illustrates acoustic error cancellation.

FIG. 3 illustrates a conventional AEC process where a recorded signal (speaker plus external audio) is captured and has an AEC mask applied (subtracted) to produce an external signal. As illustrated using "A" and "B" portions of audio, the mask includes "B" audio which may be subtracted out to produce the external signal, leaving portion "A" (among others). This is accomplished by applying the AEC mask such that unwanted speaker output is subtracted from the audio signal that is recorded. As described above, such normal or standard AEC is done by subtracting a time biased, amplitude corrected version of the signal input (to the speakers) from the recorded signal obtained by the microphone. This process introduces distortion by not having a true representation of the speaker output. Thus, the speaker output cannot be effectively cancelled in the resultant recording.

Figure 4:
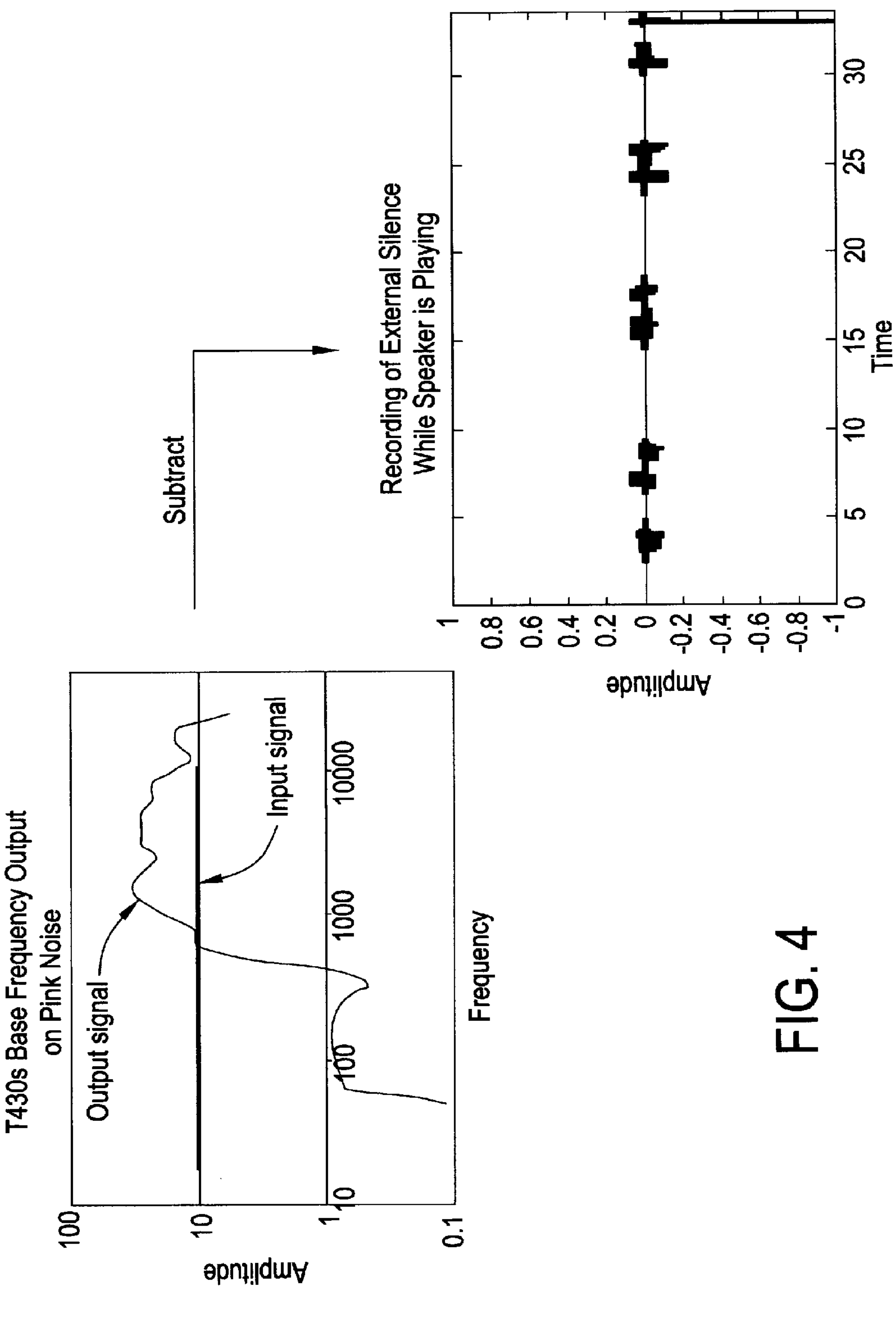
FIG. 4 illustrates acoustic leak.

This is illustrated in FIG. 4 as AEC "leak". As illustrated, because the output signal is distorted by a speaker (in this example, speakers of a LENOVO T430 THINKPAD laptop computer playing pink noise), the AEC leaks. This is essentially a mismatch between the expected (theoretical) output of a speaker and the speaker's actual output. Thus, in the example illustrated, even when the input signal is not frequency modified, the actual output does contain frequency modulation. This is because each speaker has a characteristic non-linear frequency response. Thus, if a speaker is given a signal that has equal energy in all frequencies, the speaker nonetheless will output a signal having frequencies of unequal energies (some higher, some lower). The frequency distortion is the result of one or more of speaker electrical characteristics, speaker mechanical characteristics, as well as device layout characteristics (e.g., voltage or current roll-off in the analog speaker circuitry, speaker positioning, grills over the speaker, shape of speaker openings, and/or distance from the microphone(s) doing the recording).

This results in recorded sound (distortion) in the signal not being effectively subtracted out or cancelled, even when attempting to record external silence, as illustrated in FIG. 4. In other words, some of the speaker output remains in the recorded signal.

Figure 5:
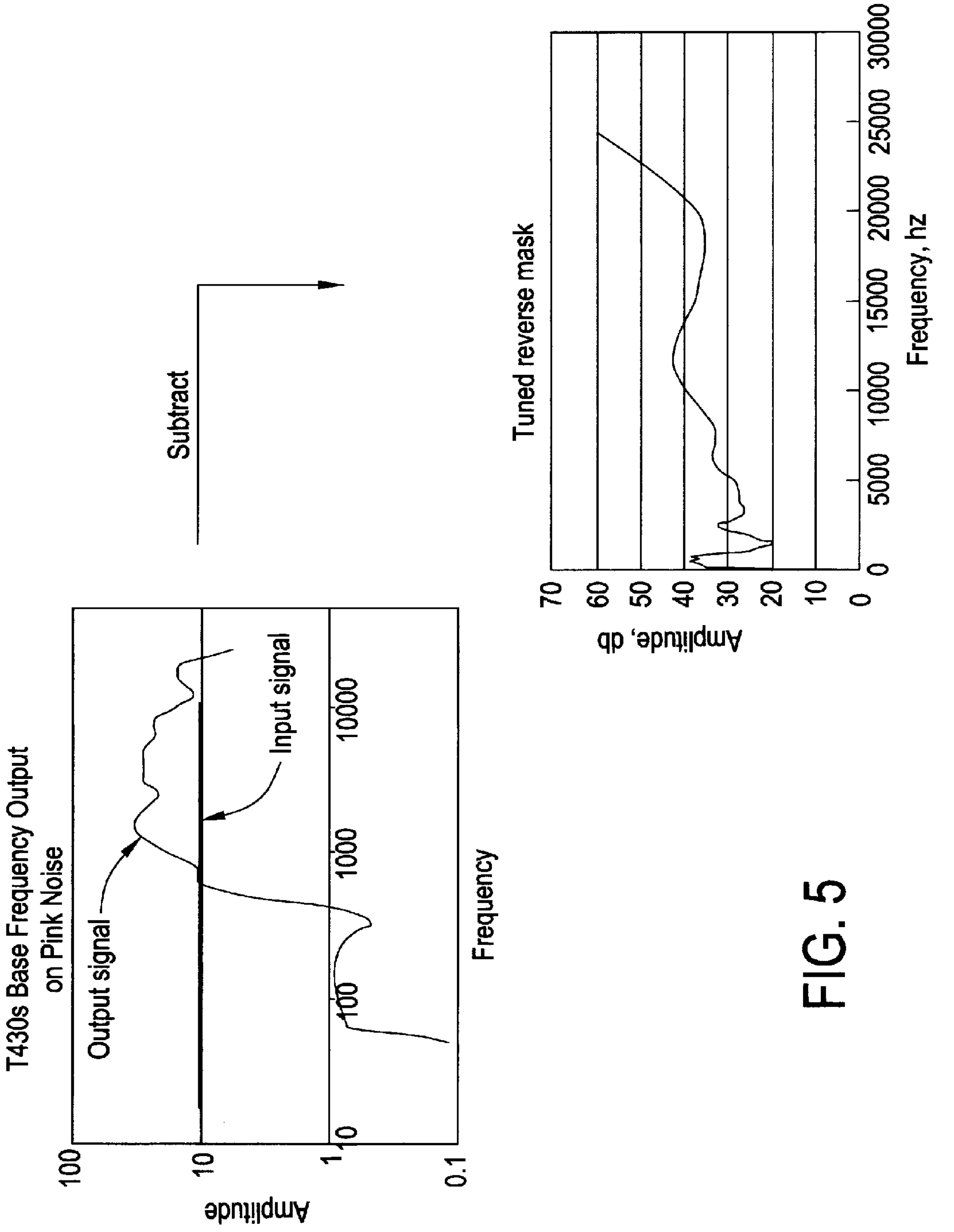
FIG. 5 illustrates formation of a tuned corrective mask.

As illustrated in FIG. 5, an embodiment may build a tuned corrective frequency mask which can be applied to correct for speaker deficiencies. The tuned corrective frequency mask is formed by leveraging knowledge about a particular speaker or speakers of a device, including the particular speaker type (and its electrical and physical characteristics) and how the overall device is put together (e.g., the physical layout or relationship of the speaker(s) relative to the microphone(s)). The tuned corrective frequency mask (tuned reverse mask of FIG. 5) therefore allows for more precise AEC that takes into account speaker distortions. The result is a more accurately corrected recorded signal that is largely free of unwanted sound distortions.

Figure 6:
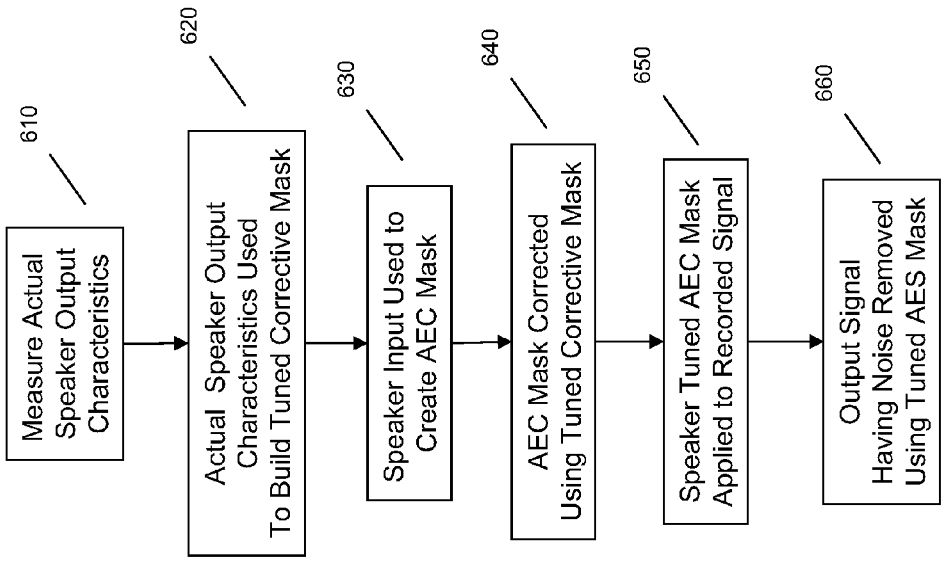
FIG. 6 illustrates an example of forming and applying a tuned AEC mask.

Turning to FIG. 6, an example method of making and using a tuned corrective frequency mask is illustrated. At 610, a measure is made of the actual speaker output characteristics that will be used to make a tuned corrective frequency mask. This is done for example in a quiet room and involves analyzing the particular form factor and electrical implementation to ascertain how the speakers handle output signals in terms of adding distortion to known input signals. This information therefore includes determining characteristics such as speaker non-linear frequency response characteristics, as discussed in connection with FIG. 4.

These characteristics are then used at 620 to build a tuned corrective mask for the particular speaker(s) situated in the particular device. This tuned corrective mask may for example be stored in a memory of an audio sub-system of the device such that a DSP has access to it for use in creating an AEC mask. Multiple corrective masks may be created and stored to handle different situations. For example, a mask to be used when front microphones are in operation may be stored along with a separate mask to be used when rear microphones are in use. Thus, when an AEC mask is created at 630, based on speaker input, an embodiment applies a correction or tuning to the AEC mask from the tuned corrective mask at 640. This procedure for example consists of converting the time based AEC data to the frequency domain, adding the inverse of the tuned frequency mask in a number of frequency windows, and then converting the result back to the time domain. The result is a speaker tuned AEC mask.

Therefore, in a simultaneous playback and record situation, when the recorded signal is processed, an embodiment applies the speaker tuned AEC mask to the recorded signal at 650 to remove noise. As described herein, the speaker tuned AEC mask takes into account the particular speaker characteristics of the device in forming the AEC mask, and thus better noise cancellation is achieved. The signal having noise removed using the tuned AES mask is output at 660. The output signal may then be stored for example as a digital audio signal in a memory device.

In brief recapitulation, an embodiment leverages knowledge, e.g., empirically determined speaker and device characteristics, to tune or correct an AEC mask. This tuned AEC mask is utilized, via transformation (e.g., FFT) and correction in the frequency domain, to cancel out noise or "echo" in the recorded signal during digital signal processing of the captured audio. The resultant audio signal that has been corrected in the frequency domain is then transformed back into the time domain and is largely free of distortions that otherwise would have been retained, i.e., if a normal or standard amplitude AEC mask had been employed.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

accessing a tuned corrective mask that has been tuned using output characteristics of a speaker and thereafter stored in a memory device;

forming, using a processor, a tuned acoustic echo cancellation mask for a specified speaker being different from the speaker, utilizing the tuned corrective mask that has been tuned for the speaker;

applying, using a processor, the tuned acoustic echo cancellation mask to a digital audio signal; and outputting an echo-cancelled audio signal.

2. The method of claim 1, wherein the tuned corrective mask tunes frequency characteristics of the tuned acoustic echo cancellation mask.

3. The method of claim 2, wherein the processor applies the tuned corrective mask in the frequency domain.

4. The method of claim 3, wherein the processor transforms the tuned acoustic echo cancellation mask to the time domain prior to applying the tuned acoustic echo cancellation mask to the digital audio signal.

5. The method of claim 1, further comprising forming a tuned corrective mask for an information handling device.

6. The method of claim 5, wherein forming a tuned corrective mask for an information handling device comprises analyzing speaker distortion characteristics of the information handling device.

7. The method of claim 6, wherein the forming a tuned corrective mask comprises forming the tuned corrective mask for a speaker output signal of an information handling device.

8. The method of claim 7, wherein the applying a tuned acoustic echo cancellation mask to a digital audio signal comprises applying the tuned acoustic echo cancellation mask to a digital audio signal captured by a microphone of the information handling device.

9. The method of claim 1, wherein the memory device comprises an on-chip memory of a digital signal processing audio sub component of an information handling device.

10. The method of claim 1, wherein more than one tuned acoustic echo cancellation mask is stored and an appropriate tuned acoustic echo cancellation mask is selected based on a particular device component being utilized.

11. The method of claim 1, wherein one or more tuned acoustic echo cancellation masks are stored and applied based on user activity.

12. An information handling device, comprising:

one or more processors; and a memory device storing instructions executable by the one or more processors to:

access a tuned corrective mask that has been tuned using output characteristics of a speaker and thereafter stored in a memory device;

form a tuned acoustic echo cancellation mask for a specified speaker being different from the speaker, utilizing the tuned corrective mask that has been tuned for the speaker apply the tuned acoustic echo cancellation mask to a digital audio signal; and output an echo-cancelled audio signal.

13. The information handling device of claim 12, wherein the tuned corrective mask tunes frequency characteristics of the tuned acoustic echo cancellation mask.

14. The information handling device of claim 12, wherein the one or more processors apply the tuned corrective mask in the frequency domain.

15. The information handling device of claim 14, wherein the one or more processors transform the tuned acoustic echo cancellation mask to the time domain prior to applying the tuned acoustic echo cancellation mask to the digital audio signal.

16. The information handling device of claim 15, wherein to form a tuned corrective mask for the information handling device comprises analyzing speaker distortion characteristics of the information handling device.

17. The information handling device of claim 16, wherein to apply a tuned acoustic echo cancellation mask to a digital audio signal comprises applying the tuned acoustic echo cancellation mask to a digital audio signal captured by a microphone of the information handling device.

18. The information handling device of claim 12, wherein the program code further comprises code to form a tuned corrective mask for the information handling device.

19. The information handling device of claim 12, wherein to form a tuned corrective mask comprises forming the tuned corrective mask for a speaker output signal of the information handling device.

20. A program product, comprising:

a storage device having computer program code embodied therewith, the computer program code being executable by a processor and comprising:

computer program code for accessing a tuned corrective mask that has been tuned using output characteristics of a speaker and thereafter stored in a memory device;

computer program code for forming a tuned acoustic echo cancellation mask for a specified speaker being different from the speaker, utilizing the tuned corrective mask that has been tuned for the speaker;

computer program code for applying the tuned acoustic echo cancellation mask to a digital audio signal; and computer program code for outputting an echo-cancelled audio signal.

* * * * *